Oct. 16, 1934.   W. B. MILNER   1,976,796
VALVE
Filed June 5, 1931
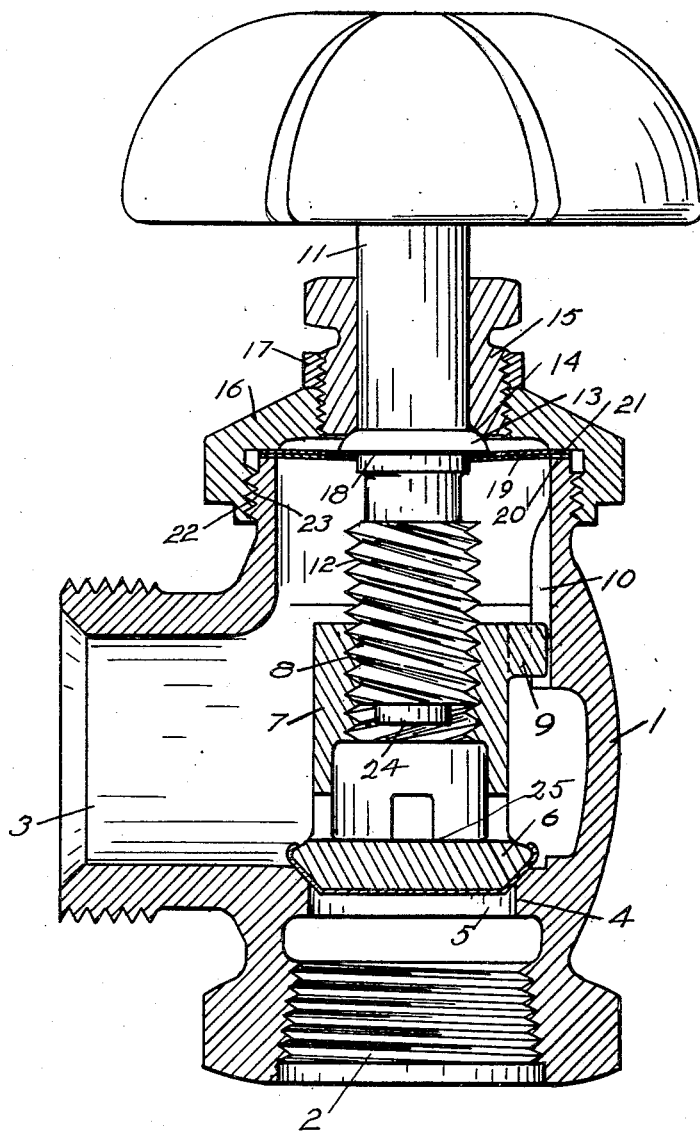
William B. Milner
INVENTOR.
BY
ATTORNEYS.

Patented Oct. 16, 1934

1,976,796

UNITED STATES PATENT OFFICE 1,976,796

VALVE

William B. Milner, Dunkirk, N. Y.

Application June 5, 1931, Serial No. 542,238

2 Claims. (Cl. 251—32)

The ordinary globe valve having a valve stem for operating the valve is often faulty by reason of the leakage past the valve stem. Various expedients have been resorted to for stopping this leakage. The object of the present invention is to improve the valve with relation to the closure around the valve stem. Features and details of the invention will appear from the specification and claims.

A preferred embodiment of the invention is illustrated in the accompanying drawing wherein is shown a cylindrical section through the valve.

1 marks the body of the valve. This is shown as an angle valve and ordinarily 2 would operate as the inlet and 3 the discharge from the valve. A diaphragm 4 has a valve opening and a valve seat 5 surrounding the opening. A valve head 6 is arranged to close on the seat 5. The valve head has an extension 7 with a screw-threaded opening 8. The extension has a lug 9 which operates between guides 10 so as to lock the valve head against turning.

A valve stem 11 is provided with a screw-threaded extension 12 operating in the screw threads 8 by means of which the valve head is moved toward and from its seat through the rotation of the stem.

The stem is provided with a shoulder 13, the upper face of which forms a closure with a seat 14 on an adjusting sleeve 15 arranged in a bonnet 16, the sleeve being locked in adjustment by a nut 17. The under surface of the shoulder 13 forms a bearing surface 18 which is engaged by resilient metal discs 19. These metal discs are seated on the upper edge 20 of the body. The discs are clamped, the engaging surface 21 of the bonnet opposing the edge 20. The bonnet is preferably screw-threaded at 22 and operates on the screw threads 23 on the body.

The bearing surface 18 is so related to the edge 20 that with the bonnet in place the discs 19 are placed under definite tension so that there is a spring-pressed engagement between the seating surface of the shoulder 13 and the seat 14. The discs themselves also form a seating engagement with the bearing surface 18 of the shoulder.

The screw-threaded sleeve 15 is provided so that the tension on the discs, or plates 19 may be adjusted to give any seating pressure that may be desired. Thus by screwing down the sleeve the discs may be given a greater deflection and tension, if desired, and by means of the nut 17 the sleeve may be locked in the adjustment. In this way a definite closure around the stem may be maintained throughout the life of the valve.

I prefer to have the end of the stem at 24 bottom on the head at 25 prior to the engagement of the upper end of the extension 7 with the shoulder, or plates 19. This prevents drawing the seat formed by the shoulder away from the seat in the bonnet.

What I claim as new is:—

1. In a valve, the combination of a body having a valve opening therein with a surrounding seat; a valve head operating on the seat; a stem having a screw-threaded connection with the head, said stem having a shoulder provided with a seating surface; a bonnet on the body having an adjustable seat engaging the shoulder; and a resilient metal plate, said plate engaging the shoulder and being seated on the body by the bonnet, said plate exerting yielding pressure on the shoulder for seating the shoulder and the adjustment of the seat varying the tension on the disc and its seating pressure on the shoulder.

2. In a valve, the combination of a body having a valve opening therein with a surrounding seat; a valve head operating on the seat; a stem having a screw-threaded connection with the head, said stem having a shoulder provided with a seating surface; a bonnet on the body; an adjustable sleeve screwed into the bonnet and having a seat engaging the shoulder; and a resilient metal plate, said plate engaging the shoulder and being seated on the body by the bonnet, said plate exerting yielding pressure on the shoulder for seating the shoulder and the adjustment of the seat varying the tension on the disc and its seating pressure on the shoulder.

WILLIAM B. MILNER.